Figure 1:
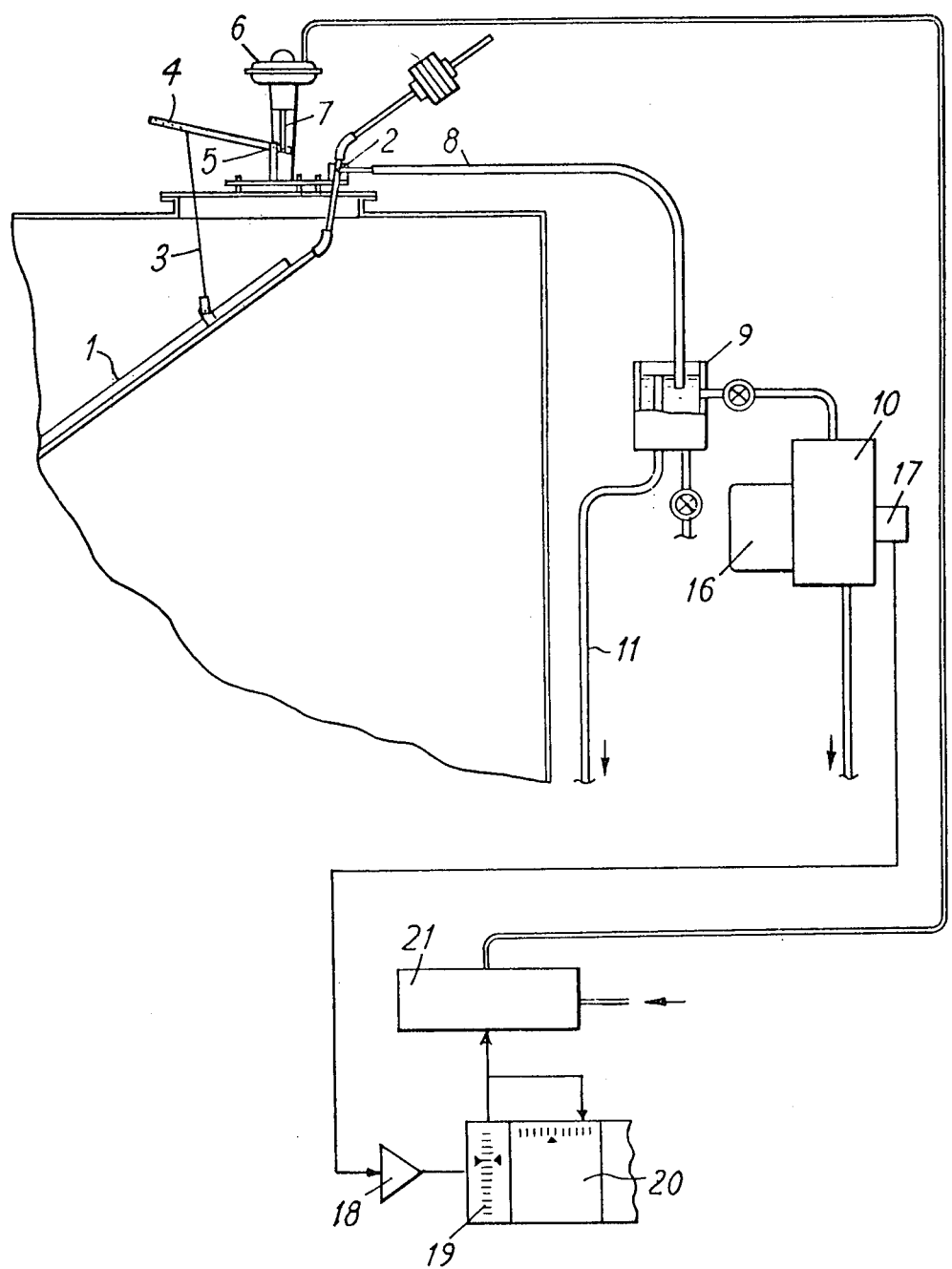

United States Patent [19]

Chandler

[11] 4,040,954
[45] Aug. 9, 1977

[54] CONTROL OF FLOCCULANT ADDITION IN SEDIMENTATION APPARATUS

[75] Inventor: John Leslie Chandler, Mandeville, Jamaica

[73] Assignee: Alcan Research and Development Limited, Montreal, Canada

[21] Appl. No.: 651,565

[22] Filed: Jan. 22, 1976

[30] Foreign Application Priority Data

Jan. 24, 1975 United Kingdom ................ 3310/75

[51] Int. Cl.² .......................... C02B 1/20; B01D 21/01
[52] U.S. Cl. .................................... 210/42 R; 210/54; 210/86; 210/96 R; 210/104; 210/105
[58] Field of Search ...................... 210/54 R, 54 A, 83, 210/84, 96 R, 97, 104, 42 R, 45, 51, 52, 53, 86, 105, 127

[56] References Cited

U.S. PATENT DOCUMENTS

| | | | |
|---|---|---|---|
| 1,908,691 | 5/1933 | Coe | 210/96 |
| 1,957,898 | 5/1934 | Mitchell | 210/96 |
| 2,245,587 | 6/1941 | Hughes | 210/96 |
| 3,194,757 | 7/1965 | Sullivan | 210/54 A |
| 3,256,902 | 6/1966 | Porter | 210/96 |
| 3,262,878 | 7/1966 | Beckley | 210/96 |
| 3,375,928 | 4/1968 | Chase | 210/83 |
| 3,393,149 | 7/1968 | Conley | 210/96 |
| 3,399,133 | 8/1968 | Gerdes | 210/96 |
| 3,443,692 | 5/1969 | Halsey | 210/97 |
| 3,462,364 | 8/1969 | Carlson | 210/42 R |
| 3,618,766 | 11/1971 | Morey | 210/96 |
| 3,731,807 | 5/1973 | Louboutin | 210/96 |
| 3,812,966 | 5/1974 | Beach | 210/84 |
| 3,834,128 | 9/1974 | Gardiner | 210/96 |
| 3,953,328 | 4/1976 | Aldag | 210/97 |

Primary Examiner—Thomas G. Wyse
Assistant Examiner—Ernest G. Therkorn
Attorney, Agent, or Firm—Cooper, Dunham, Clark, Griffin & Moran

[57] ABSTRACT

A process for settling suspended particles in a liquid medium comprises supplying a stream of liquor for clarification to a settlement vessel, taking off an overflow of substantially clear liquor from the top of the settlement vessel, periodically or continuously removing settled particles in the form of a flowable mud from the bottom of the settlement vessel, supplying flocculating agent for admixture with the liquor entering said settlement vessel and controlling the relative proportions of flocculating agent and supplied liquor in such manner as to maintain a substantial layer of cloudy liquor lying between said flowable mud and a supernatant clear liquor layer in said settlement vessel. The upper boundary of the cloudy liquor layer is continuously monitored by a probe device which draws liquor from within the cloudy layer and forwards it to an instrument which compares its turbidity with a known value. The level of the probe is automatically raised or lowered to cancel out any departure from the known value. The supply of flocculating agent may be automatically controlled in response to change of position of the probe.

7 Claims, 2 Drawing Figures

CONTROL OF FLOCCULANT ADDITION IN SEDIMENTATION APPARATUS

The present invention relates to the operation of apparatus for separating finely divided suspended solids from a stream of liquid.

It is well known to separate suspended solids from waste waters by the addition of a fluocculating agent so as to obtain an acceptably clear liquor to permit discharge. It is common practice to supply a stream of turbid liquor to a so-called thickener or sedimentation tank, from the top of which a stream of clear liquor is drawn off over an overflow weir and a stream of relatively thick slurry or flowable mud is drawn off at the bottom as an underflow. In order to achieve the desired clear outflow from the sedimentation tank a solution or suspension of a flocculating agent is added to the liquor either in or before entry to the sedimentation tank in order to fluocculate and precipitate the suspended particles so that the turbid liquor is separated into a relatively large volume of acceptably clear liquor and a relatively small volume of a flowable mud having a high solids content, which may be discharged as an underflow.

A sedimentation apparatus of the type in question comprises a large diameter cylindrical vessel with vertical axis, having a shallow conical bottom, leading to a central underflow outlet. An axially mounted rotor shaped to cooperate with the conical bottom carries a plurality of rake teeth usually in the form of short, angled, blades and turns at a slow rate. The function of the rotor is to exert a raking action on the settled flocculated solids so that they do not become excessively compacted and to move the settled layer so that a steady flow towards the outlet is maintained. The turbid liquid inflow is through one or more feedwells, the flocculant flow being mixed with the inflow liquid either in or just outside the feedwell or, in some circumstances, in the feed line to the feedwell.

In the operation of such sedimentation apparatus it is obviously desirable to carry out the procedure with the minimum addition of flocculating agent necessary to achieve the desired result.

A typical sedimentation operation with which the present invention is concerned is the flocculation and separation of the suspended particles contained in the liquors discharged from the bauxite digestion stage of the Bayer process for the extraction of alumina. The so-called "red mud" discharged from the Bayer process contains a large amount of very fine particles, which only settle with great difficulty in the absence of a flocculating agent. With the aid of a flocculating agent the suspended particles coagulate into relatively large flocs which settle into a layer at the bottom of the sedimentation apparatus. Such layer typically has a solids content of 1-30% by weight. Periodic or continuous raking is employed to prevent complete settling and thus avoid accumulation of material which cannot be removed from the apparatus as an underflow.

In the Bayer process the separation of red mud particles from liquor by sedimentation may be effected at two separate stages of the process. Thus the sedimentation apparatus or thickener may be employed to clarify the red mud liquor discharged from the digesters so as to obtain an acceptably clear sodium aluminate solution for supply, after a polishing filter stage, to the precipitation stages, in which alumina trihydrate is recovered by the conventional seeding procedure.

As will be appreciated, the mud discharged as an underflow from such a clarification stage has a high contact of valuable sodium aluminate liquor, which it is desired to recover in the form of a relatively dilute sodium aluminate solution by countercurrent washing. A train of sedimentation vessels may be employed for that purpose, the liquor overflows from which will be progressively weaker sodium aluminate solutions, viewed from the direction of mud travel: (progressively stronger sodium aluminate solutions viewed from the direction of liquor travel).

It has long been the practice to employ starch or a starchy material, such as wheat flour, as a flocculating agent in the sedimentation of Bayer process red mud. In more recent times these have been to some extent superseded by synthetic flocculating agents, such as a polyacrylamide. While such synthetic flocculating agents are much more effective than starch or starch-containing materials, they are also much more expensive, so that maintenance of economy in the dosage employed is of substantial importance.

The method of the present invention is primarily of importance in its application to sedimentation procedures in which synthetic flocculants are employed, but substantial benefits are also obtained when more conventional flocculating agents, such as starch, are employed. In some instances both types of flocculating agent may be advantageously employed in conjunction with each other.

As will appear later, the procedure of the present invention is most conveniently employed in a system where the flocculant may be fed in automatically in measured quantity in response to signals from control instrumentation. For that purpose it is most convenient for the flocculating agent to be supplied in the form of a solution. Most synthetic flocculating agents are supplied in the form of sodium derivatives of long chain polymers and such derivatives may be dissolved in water or dilute alkali to form solutions of a viscosity low enough to permit controlled dispensation and distribution to be effected.

In the operation of sedimentation apparatus of the type under consideration, the utilisation of a flocculant leads to a more or less clearly defined bottom layer of mud in a state of hindered settlement with a supernatent layer of more or less turbid liquor. In some instances the overflow liquor has a perceptible turbidity. In other instances the whole of the supernatant liquor above the liquor/mud interface is substantially clear. In yet other instances there is a layer of turbid liquor above the mud/liquor interface and a top layer, from which overflow takes place, of an essentially clear liquor.

We find that typically in settling Bayer process red muds an acceptably clear liquid contains below 40 p.p.m. (by weight) of solids. In the cloudly or turbid liquor layer the solids content is in the range of 50 – 300 p.p.m. in the form of particles in a free settling condition so that there is a progressive increase in solids content and turbidity from the top to the bottom of such layer.

The present invention is based on an appreciation that maximum economy may be achieved in the utilisation of flocculant when there is a definite cloudy settlement layer or zone in the supernatant liquid above the mud layer. This cloudy settlement layer should substantially fill the whole of the conical bottom portion of the thickener, but should not rise appreciably into the cylindrical portion of the thickener.

According to a principal aspect of the present invention a process for settling suspended particles in a liquid medium comprises supplying a stream of liquor for clarification to a settlement vessel, taking off an overflow of substantially clear liquor from the top of the settlement vessel, periodically or continuously removing settled particles in the form of a flowable mud from a layer of such mud in the bottom of the settlement vessel, supplying flocculating agent for admixture with the liquor entering said settlement vessel and controlling the relative proportions of flocculating agent and supplied liquor in such manner as to maintain a substantial layer of cloudy liquor lying between said flowable mud and a supernatant clear liquor layer in said settlement vessel. The control of the relative proportions of flocculant to liquor may be achieved by change of the rate of flocculant dosage and/or change of the liquor input rate. The flocculating agent is preferably supplied as a steady stream of a solution or suspension of the flocculating agent. It may, however, be supplied in solid form. In either case the flocculating agent may be supplied intermittently as a controlled dosage in place of a steady stream of liquid or solid.

The method of operation of the present invention may be performed by an operator who changes one or both of the mentioned flow rates in accordance with any change of the observable upper level of the cloudy liquor layer. However, the method of the invention is exceptionally well adapted for performance under the control of automatic control equipment which monitors the upper level of the cloudy layer. The detection of the upper limit of the cloudy liquor may be achieved by the use of photoelectric devices or devices based on ultrasonic attenuation.

It has previously been proposed to control the feed of flocculant automatically in response to changes in the operating conditions in a sedimentation apparatus of the present type, but in such system the control was exercised in response to changes in the level of the mud/liquor interface and in the density of (solid contents of) the mud underflow. The present method, however, is more sensitive and more positive in that it ensures (except in the event of very rapid change in conditions) that the overflow is of acceptable clarity.

To carry out the procedure of the present invention under automated control it is necessary to provide a means for continuous detection or estimation of the upper limit of cloudy liquor. The cloudy liquor layer, having a solids concentration of 100 - 200 p.p.m., contains a relatively small total quantity of solids and can therefore rise or fall rapidly, unlike the partly compacted solids layer which can change only slowly. Control of the cloudy liquor layer therefore requires an instrument for continuous indication and/or recording of its level so that this variable can be used to control the flocculant feed, either manually or automatically.

In one example the height of the cloudy liquor layer is detected by means of a probe which is automatically maintained at a preselected position at or near the upper limit of the cloudy liquor layer. As the layer rises or falls, the probe is automatically raised or lowered in response to change in the level of such layer. This is achieved by positioning the probe at a level at which the liquor has a slight, but detectable turbidity and raising or lowering the probe in response to change in liquor turbidity at the operating level of the probe. A control signal derived from the position of the probe may be used to control the supply of flocculant and/or its position may be recorded on a conventional recorder, which may be used by an operator to make appropriate changes in flocculant supply.

There are various possible means of making the probe self adjusting, dependent on a continuous assessment of the turbidity of the liquor at the sampling end of the probe. The measurement can be made either:
 a. by attaching a sensing element to the end of the probe, or
 b. by continuously or intermittently withdrawing a sample of liquor through the probe and passing it through, or past, a sensing element outside the sedimentation vessel.

A preferred instrument for continuous recording of the height of the cloudy liquor layer employs the measurement of light transmittance through a continuous sample withdrawn from the sedimentation vessel. The sample is passed through a light-transmittance photoelectric turbidity measuring device. The signal from the photoelectric turbidity measuring device is amplified and is then compared with a set value. A signal representing the difference is employed to control a pneumatic actuator to raise or lower the probe. It will be understood that the turbidity of the cloudy liquor layer is less adjacent its upper limit than it is in the main part of the layer. The set value corresponds to a turbidity near the upper limit of the cloudy layer so that the probe is raised or lowered by the actuator to maintain it at a position at which the turbidity of the liquid corresponds with the set value. The probe actuator may be arranged so that the probe height is very nearly proportional to the pneumatic signal applied to the actuator. The height of the probe is preferably continuously recorded. The purpose of the recorder is to provide an operator with information to permit him to semi-continuously or continuously adjust the flocculant charge so that the cloudy liquor layer neither reaches the overflow of the sedimentation vessel nor falls to too low a level. Even where the flocculant flow is controlled automatically it is desirable for the recorder to be employed to check that there has been no undue change of level.

Observation of the recorded information shows that there is a cloudy liquor level fluctuation due to the action of the rakes in addition to the much slower fluctuation in level due to operational changes. Each time a rake arm passes the sampling probe, it stirs up the cloudy liquor layer in that area and the recorder shows this as a sudden increase in the cloudy liquor level. After the rake has passed the probe, the level returns to normal within about a minute. The result is a succession of peaks on the recorder chart, synchronous with the rake rotation. A typical rake rotation speed is 4 revolutions per hour and this produces 8 peaks per hour on the chart if the rake has two arms, or 12 peaks per hour for three arms. This regular frequency fluctuation is an advantage in that it clearly indicates that the probe is following the cloudy liquor layer (as desired) and not the compacted mud level. The compacted mud level cannot rise and fall at such a rate.

It is also a disadvantage as it makes it more difficult to use the signal to control the flocculant feed rate, it being undesirable and unnecessary to vary the flocculant rate in synchronism with these short duration disturbances of the cloudy liquor level.

The relatively high frequency fluctuation does not give rise to any problem for manual control of the flocculant. So long as the flow rate level is recorded, the operator can easily see whether the peaks are rising or falling. If a computer is used to control the flocculant flow it can be programmed to ignore the paeks in the cloudy liquor level.

Although it is clearly preferable to measure the turbidity of the cloudy liquor on a continuous basis, in many instances it is satisfactory to determine the upper limit of the cloudy liquor layer by making such measurement at periodic intervals.

Figure 2:
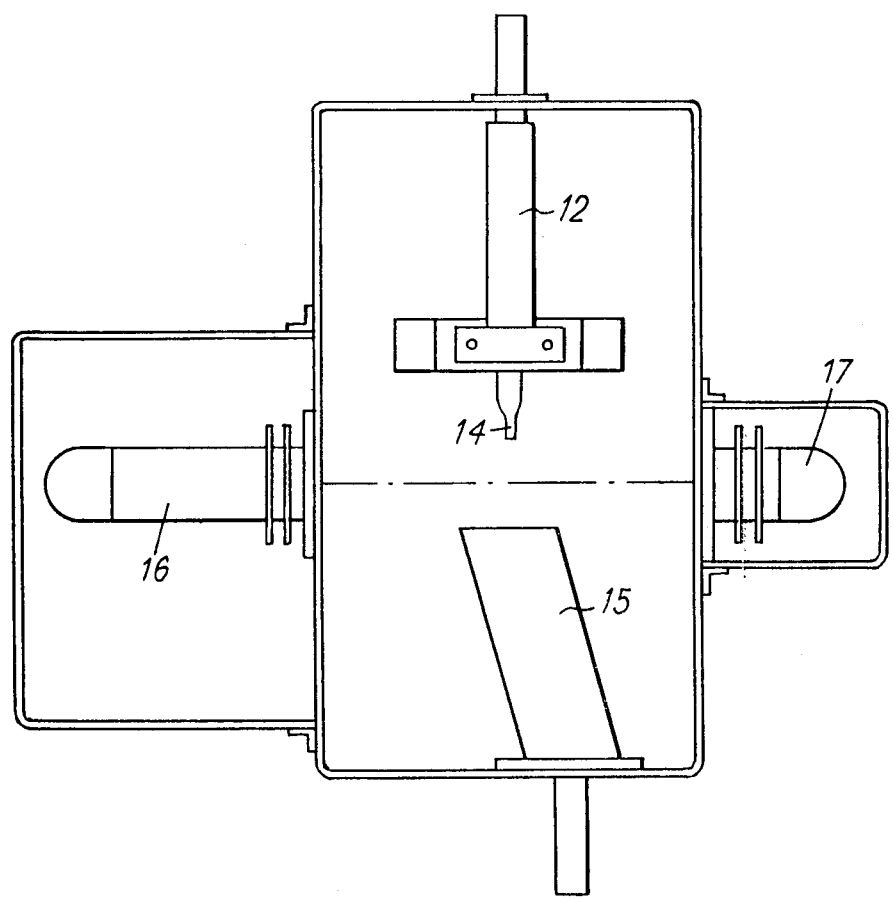

Referring now to the accompanying drawings:

FIG. 1 diagrammatically illustrates the probe system for sampling the cloudy liquor and recording and controlling the height of the probe, and FIG. 2 is a view of the turbidity measuring device.

A counterweighted probe tube 1 extends downward from a mounting point on the roof of the sedimentation vessel into the liquor. The height at which the sample is taken off may be altered by tilting the probe tube 1 about a pivot at 2. The probe tube is supported by a cable or chain 3 from a lever 4, which is pivoted about its pivot 5 by a pneumatic actuator 6, which has an operating member 7, the extension of which is substantially proportional to the pneumatic pressure applied to it.

Liquor is siphoned through the probe tube 1 to a siphon pipe 8, which is led out through pivot 2 and is supplied to a reservoir 9, which provides a constant head of liquor for the turbidity measuring device 10. Reservoir 9 is provided with an overflow pipe 11, which is connected to a sump, to which the outflow from the device 10 is also led. The liquor from the sump is preferably returned to the sedimentation vessel.

The device 10 (FIG. 2) comprises an inlet tube 12, leading to an elongated nozzle 14, from which a curtain of liquid falls into an inclined funnel 15. A light beam from a light source 16 is directed through the curtain of liquor to a photoelectric cell 17, which produces an output signal dependent upon the turbidity of the liquor in the curtain. The advantage of the illustrated device is that the turbid liquor does not contact the windows, behind which light source 16 and photoelectric cell 17 are positioned. This is of special importance in the case of the highly caustic liquors used in the Bayer process.

The output signal from the photoelectric cell 17 is amplified by amplifier 18 and applied to a controller 19. There it is compared with a set value and the resulting output signal from the controller 19 is applied to a recorder 20 and is also applied to a converter 21, which provides a pneumatic pressure proportional to the output signal of the controller 19, for application to the actuator 6 so that any increase in turbidity of liquor entering the device 10 is reflected by an increase in the pressure applied to the actuator 6 and thereby a raising of the lower end of the probe tube 1.

In a similar way the output from the controller may be employed to open and close a valve in the flocculant supply line so that the rate of flocculant flow is automatically increased in response to any rise in the level of the mouth of the probe tube, as evidenced by an increase in turbidity of the liquor passing through the device 10.

It will be understood from the foregoing description that the pneumatic signal progressively increases with increase in turbidity of the liquor withdrawn through the probe. As the turbidity of the liquor increases the probe is raised but its input end is at an increasing distance from the upper limit of the turbid layer. Where there is no automatic control of the flow of the flocculating agent, such control is effected by an operator who increases or decreases the flow of flocculant in dependence on the values indicated by the recorder with the intention of maintaining the depth of the turbid layer as constant as possible.

In operating thickeners in connection with the Bayer process for the production of alumina it has been found possible to achieve a reduction of at least 25% in the amount of flocculating agent consumed, as is evidenced by the following examples of the use of the invention in operating thickeners.

EXAMPLE 1

A 100 ft. diameter thickener was fed at an average rate of 600 lb/min of red mud as an 8% by weight suspension. The slurry flow therefore averaged 7500 lb/min or 113 cu. ft. per minute. The flow rate and concentration both fluctuated above and below these averages, by as much as 50% at times, due to normal fluctuations in the countercurrent decantation washing system of which the thickener forms a part.

By observing the chart which provides a continuous record of the cloudy liquor layer level, the operator periodically adjusted the flow of flocculant (which is added to the red mud slurry where it enters the thickener) so that just sufficient flocculant was added at all times to keep the upper limit of the cloudy (turbid) liquor level constant, irrespective of whether the instantaneous inflow of slurry is above or below the average.

Over a typical 36-hour period of operation, the flocculant flow, controlled in this way, averaged 2.17 U.S. gals. per minute, but it varied between limits of 1.5 gals. and 3.5 gals. according to the slurry demand. If there had been no control, the flow would have to be kept constant at the maximum of 3.5 gals. per minute required when the solids input was at a maximum, because the operator would have no means of knowing that the flocculant demand was lower at other times during the period. Thus, the saving of flocculant due to use of the invention is the difference between 3.5 gals. per minute and 2.17 gals. per minute, or 1.33 gals. per minute, or 38% of the flocculant.

The underflow rate averaged 50 cu. ft. per minute during the 36 hours.

EXAMPLE 2

Over another 36-hour period an identical thickener was treating 200 cu. ft. of slurry per minute, direct from the bauxite digesters, at a slurry solids concentration of 3.5% by weight. The red mud solids flow was 450 lb/minute on average.

In addition to variation in the flow rate, as in the previous example, the requirement of flocculant per unit weight of mud also varied due to varying properties of the bauxite being digested.

Over the 36-hour period, the demand for flocculant, as shown by the cloudy liquor level recorder chart, varied from a minimum of 1.5 gals. per minute to a maximum of 4.5 gals. per minute. Without the control system the flow of 4.5 gals. per minute would have had to be maintained to ensure a clear overflow. The saving of flocculant due to the control is therefore 4.5 minus the average flow of 3.1 gals. per minute, representing a saving of 31%.

The underflow rate averaged 40 cu.ft. per minute during the 36 hours.

I claim:

1. A process for settling suspended particles in a liquid medium comprising supplying a stream of liquor containing suspended particles to a settlement vessel for clarification by settlement of particles concentrating in the form of a flowable mud in the lower portion of the vessel thereby providing substantially clear liquor in the upper portion of the vessel, taking off an overflow of said substantially clear liquor from the top of the settlement vessel, removing settled particles in the form of said flowable mud from the bottom of the settlement vessel, supplying flocculating agent for admixture with the liquor entering said settlement vessel and controlling the relative proportions of flocculating agent and supplied liquor for maintaining a substantial layer of cloudy liquor lying between said flowable mud and a supernatent clear liquor layer in said settlement vessel.

2. A process according to claim 1 in which the flocculating agent is supplied in the form of a steady stream of a solution or suspension of the flocculating agent.

3. A process according to claim 1 in which the input flow rate of liquor and/or the flow rate of the stream of flocculating agent are controlled in response to change of the upper level of the cloudy liquor layer.

4. A process according to claim 1 in which the liquor for clarification is derived from the digestion of bauxite for the production of alumina.

5. A process according to claim 1 further including detecting the upper limit of the cloudy liquor layer by means of a detector device and changing the rate of supply of flocculating agent to counteract change in the height of said upper limit.

6. A process according to claim 5 further including detecting the upper limit of the cloudy liquor layer by means of a vertically movable probe device, measuring the turbidity of the liquor at the level of said probe device and adjusting the position of said probe device in response to change in the turbidity of the liquor at said level from a predetermined value corresponding to a level proximate to the upper limit of said cloudy liquor layer.

7. A process according to claim 6 further including drawing a sample of cloudy liquor from a position close to but beneath the upper limit of the cloudy liquor layer through a tubular probe device, measuring the turbidity of the withdrawn sample, varying the height of the inlet of the tubular probe device to counteract change in the measured turbidity of the liquor and changing the supply rate of the flocculating agent to counteract change in the measured turbidity.

* * * * *